United States Patent
Paolilli et al.

(10) Patent No.: US 12,404,401 B2
(45) Date of Patent: Sep. 2, 2025

(54) DURABLE PRINTABLE LABEL FILM

(71) Applicant: Toray Plastics (America), Inc., North Kingstown, RI (US)

(72) Inventors: Tracy Paolilli, North Kingstown, RI (US); Joshua Cloutier, North Kingstown, RI (US); Yu Abe, North Kingstown, RI (US)

(73) Assignee: Toray Plastics (America), Inc.

( * ) Notice: Subject to any disclaimer, the term of this patent is extended or adjusted under 35 U.S.C. 154(b) by 621 days.

(21) Appl. No.: 17/889,765

(22) Filed: Aug. 17, 2022

(65) Prior Publication Data

US 2023/0070878 A1    Mar. 9, 2023

Related U.S. Application Data

(60) Provisional application No. 63/234,509, filed on Aug. 18, 2021.

(51) Int. Cl.
*C08L 67/02* (2006.01)
*B32B 7/12* (2006.01)
*B32B 27/08* (2006.01)
*B32B 27/32* (2006.01)
(Continued)

(52) U.S. Cl.
CPC ................ *C08L 67/02* (2013.01); *B32B 7/12* (2013.01); *B32B 27/08* (2013.01); *B32B 27/32* (2013.01); *C08K 3/36* (2013.01); *C08L 33/08* (2013.01); *B32B 2250/242* (2013.01); *B32B 2255/10* (2013.01); *B32B 2255/26* (2013.01); *B32B 2255/28* (2013.01); *B32B 2264/1021* (2020.08); *B32B 2307/518* (2013.01);
(Continued)

(58) Field of Classification Search
CPC . C08L 67/02; C08L 33/08; B32B 7/12; B32B 27/08; B32B 27/32; B32B 2250/242; B32B 2255/10; B32B 2255/26; B32B 2255/28; B32B 2264/1021; B32B 2307/518; B32B 2307/704; B32B 2307/75; B32B 2519/00; B32B 27/18; B32B 2270/00; C08K 3/36; C09D 133/08; C09D 167/00
See application file for complete search history.

(56) References Cited

U.S. PATENT DOCUMENTS

| | | | |
|---|---|---|---|
| 3,887,745 A | 6/1975 | Yoshii et al. | |
| 3,952,073 A | 4/1976 | Isaka et al. | |
| 4,045,515 A | 8/1977 | Isaka et al. | |

(Continued)

FOREIGN PATENT DOCUMENTS

| | | | | |
|---|---|---|---|---|
| WO | WO-2014053707 A1 * | 4/2014 | ............... | G09F 3/10 |
| WO | WO-2018147335 A1 * | 8/2018 | ............... | C08J 5/18 |

OTHER PUBLICATIONS

Machine translation of WO 2018/147335 A1 (Year: 2025).*

*Primary Examiner* — Scott R. Walshon
(74) *Attorney, Agent, or Firm* — Raj S. Dave; Dave Law Group LLC

(57) ABSTRACT

Embodiments relate to a film comprising a base layer comprising a biaxially oriented polypropylene (BOPP); a coating layer comprising a polyester, an acrylic, and a crosslinker; and a primer; wherein the film has a haze change, measured according to ASTM D1003, before exposure to boiling water for 30 minutes and after exposure to boiling water for 30 minutes of 4 units or less.

20 Claims, 2 Drawing Sheets

(51) Int. Cl.
*C08K 3/36* (2006.01)
*C08L 33/08* (2006.01)

(52) U.S. Cl.
CPC ..... *B32B 2307/704* (2013.01); *B32B 2307/75* (2013.01); *B32B 2519/00* (2013.01)

(56) References Cited

U.S. PATENT DOCUMENTS

| | | |
|---|---|---|
| 9,937,525 B2 | 4/2018 | Paolilli et al. |
| 2007/0134470 A1 | 6/2007 | Jesberger et al. |
| 2008/0145670 A1* | 6/2008 | Song ..................... C09J 123/10 |
| | | 428/420 |
| 2017/0009108 A1* | 1/2017 | Mitchell .................. C09J 7/29 |

* cited by examiner

DURABLE PRINTABLE LABEL FILM

CROSS REFERENCE TO RELATED APPLICATION(S)

This application claims priority to U.S. Provisional Application No. 63/234,509, filed on Aug. 18, 2021, which is incorporated herein by reference in its entirety.

FIELD OF THE INVENTION

The present disclosure relates to an optically clear biaxially oriented polypropylene label film having acrylic top coating material having excellent adhesive properties and ability to withstand harsh conditions, such as high temperature sterilization/boiling.

BACKGROUND OF INVENTION

A commercially and technically important utility for biaxially oriented polypropylene films is serving as a component of many articles such as food labels. The thermal stability, dimensional stability, chemical resistance, relative high surface energy, optical clarity as well as cost effectiveness of biaxially oriented polypropylene films are beneficial for typical end use applications. Regarding the optical clarity, biaxially oriented polypropylene films can be used for instance as a label for beverage bottles, boil-in-the-bag food products, and products of such requiring sterilization. Typically, applications will involve placing optically clear acrylic coating material onto the biaxially oriented polypropylene films.

U.S. Pat. No. 3,887,745 describes a two-layer polypropylene tape in which a thick secondary layer is uniaxially oriented in the transverse (or vertical) direction to promote linear tearing in the tape cross direction. Similarly, U.S. Pat. Nos. 3,952,073 and 4,045,515 describe tape backings containing blends of isotactic polypropylene and random propylene-ethylene copolymers. The tape backing is then oriented to produce a film having greater orientation in the transverse direction than in the machine direction to produce a film having good finger tear ability across the film.

U.S. Pat. No. 9,937,525B2 teaches about a highly optically clear, composite film having a predominantly thermoplastic polyester base layer and a primer layer of a polyester and polyurethane blend composition. The base layer preferably has an A/B/C layered structure with a substantially particle-free core layer B of polyester and outer layers A and C of polyester containing nonpolyester, organic and/or inorganic particles. The primer layer is preferably applied to the base layer from solution that is organic solvent-free and is crosslinked using a carbodiimide crosslinking agent. The primer layer and base layer composite can be laminated with a protective layer of primarily acrylic polymer for a solar control film. Various layers of the composite and solar control films can contain effective amounts of functional additives, such as UV light blockers. Polyurethane in the primer, especially in combination with crosslinking by the carbodiimide, provides the acrylic coated polyester base solar control film with notably reduced iridescence and durable adhesion between polyester and acrylic layers in moist and warm service conditions.

US20070134470A1 teaches about a multilayer, white, biaxially oriented polyester film comprising a base layer (B), which comprises a thermoplastic polyester and a white pigment, and also at least one outer layer (A). The outer layer (A) also comprises an antiblocking agent, alongside a white pigment (whitening pigment). If appropriate, the inventive film has at least one functionalized surface which, for example, has good adhesion to other polymer layers or to other metal layers or to printing inks. To this end, this surface is in-line-coated with an adhesion-promoting layer.

Although, biaxially oriented polypropylene film and acrylic coating each are optically clear, the composite film of biaxially oriented polypropfilm coated with acrylic material can have adverse optical properties. For example, the coating layer can exhibit excessive cracking as a result of the transverse direction stretch that an inline coating is exposed to vs. an off-line coating that is not exposed to stretching.

Improved sterilization processes are desirable in the label industry for many applications. Such as but not limited to boiling, sterilization, ice and water immersion.

Another challenge with the acrylic material-coated polypropylene films is adhesion between layers of acrylic material and the polypropylene layer. In general, biaxially oriented polypropylene film has a highly crystalized surface that makes the polypropylene difficult to adhere to such acrylic coating layers. To overcome this drawback, an adhesion layer is sometimes used between the polypropylene and acrylic polymer layers to improve adhesion.

SUMMARY OF INVENTION

An embodiment relates to a film comprising a base layer comprising a biaxially oriented polypropylene (BOPP); a coating layer comprising a polyester, an acrylic, and a crosslinker; and a primer; wherein the film has a haze change, measured according to ASTM D1003, before exposure to boiling water for 30 minutes and after exposure to boiling water for 30 minutes of 4 units or less.

In an embodiment, according to FTIR, the film has a first absorbance at a first wavelength of 1380 cm-1 higher than a second absorbance at a second wavelength of 1150 cm-1 and a third absorbance at a third wavelength of a $1450 \text{ cm}^{-1}$ wavelength; wherein the third absorbance is higher than a fourth absorbance at a fourth wavelength of 1730 cm-1.

In an embodiment, the primer is included in the coating layer.

In an embodiment, the primer produces a higher adhesion between the base layer and the coating layer under moist, warm, boiling and sterilization conditions as compared to a comparable film having a composition as that of the film but not containing the primer.

In an embodiment, the film is configured to be a printable label.

In an embodiment, the film having a high crystallinity in a range of about 90-99% isotactic index.

In an embodiment, the base layer comprises a print receptive layer, a core layer, and an adhesive receptive layer.

In an embodiment, the core layer comprising polypropylene.

In an embodiment, the print receptive layer comprises a first component for wettability of a coating adhesive and a second component to form an affinity with the BOPP of the core layer.

In an embodiment, the first component and the second component are same.

In an embodiment, the first component comprises MAH-g-PP.

In an embodiment, the film further comprises a barrier layer comprising maleic anhydride and a polyolefin.

In an embodiment, an adhesive layer is between the barrier layer and a core layer.

In an embodiment, the adhesive layer comprises maleic anhydride and a polyolefin.

In an embodiment, the print receptive layer comprises maleic anhydride grafted polypropylene (MAH-g-PP), HOPP, or a copolymer polypropylene (COPP).

In an embodiment, the core layer comprises an isotactic polypropylene and a crystalline polypropylene.

In an embodiment, the crystalline polypropylene comprises about 94% isotactic index or more.

In an embodiment, the adhesive receptive layer comprises a copolymer polypropylene (COPP) and HOPP.

In an embodiment, the COPP comprises about 4% by of polyethylene under an isotatic polypropylene domain.

In an embodiment, the COPP has a surface energy increase by about 2 dyne level by a corona treatment.

In an embodiment, the coating layer comprises polyurethane and/or but not limited to acrylics In an embodiment, the primer comprises polyurethane and/or but not limited to acrylics.

In an embodiment, the crosslinker comprises carbodiimide, melamine or aziridine.

In an embodiment, the base layer comprises about 2% to about 4% by weight of the print receptive layer, about 92% to about 96% by weight of the core layer, and about 2% to about 4% by weight of the adhesive receptive layer, wherein all weights are based on a total weight of the base layer.

In an embodiment, the film further comprises silica particles.

In an embodiment, the film is configured to be printable using an ink.

In an embodiment, the ink is selected from a waterborne ink, a UV borne ink, or a solvent borne ink.

DETAILED DESCRIPTION

Definitions and General Techniques

Figure 1:
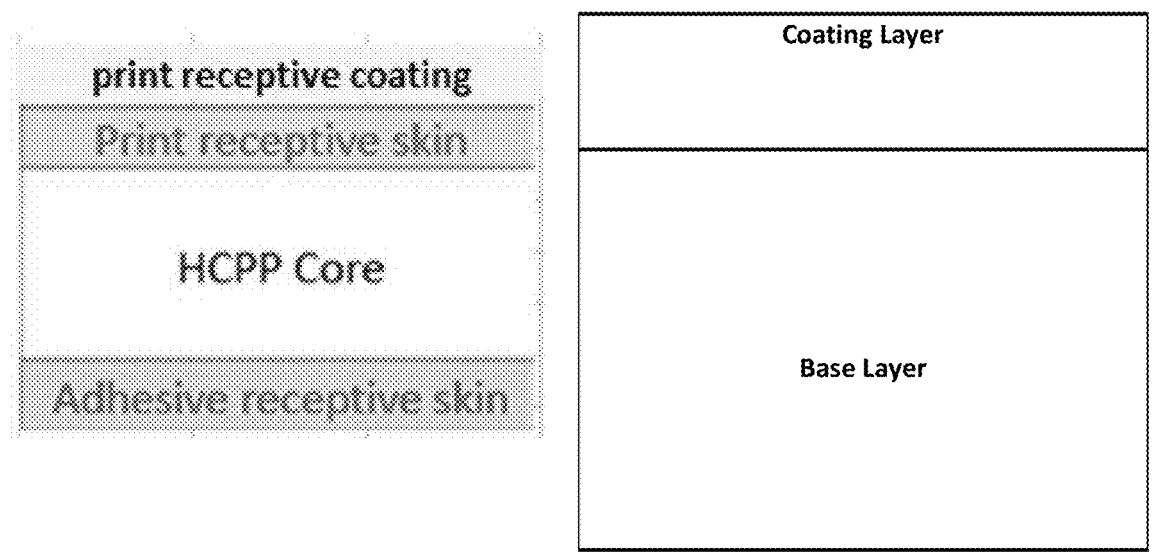
FIG. 1 illustrates an arrangement of different layers in a polymeric film.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

The term "Biaxially oriented polypropylene" (BOPP) film is a thin, plastic film that can be stretched both mechanically, and also manually using a cross direction technique.

In an embodiment, Biaxially oriented polypropylene (BOPP) film is stretched in both machine and transverse directions, producing molecular chain orientation in two directions. BOPP film is produced by a tenter frame process, in which a thick extruded sheet is heated to its softening point (not to the melting point) and is mechanically stretched by 300-400%. Stretching in the tenter frame process is usually 4.5:1 in the machine direction and 8.0:1 in the transverse direction, although these ratios are fully adjustable. It is a widely used process and a glossy, transparent film is produced. The coated polypropylene film also provides a printable surface for inks. Such as water borne, solvent and UV inks. The polypropylene film may have weatherable properties and fit for use for durable film applications, such as pasteurization and water emersion. When BOPP films are coated with an acrylic modified coating after the machine direction and before the transverse direction it has been found that not only does the coating provide increased toughness, increased stiffness, enhanced clarity, improved solvent resistance, and ink adhesion. It also has improved adhesion and clarity through boiling and sterilization processes.

The term "Polyester" is a category of polymers that contain the ester functional group in every repeat unit of their main chain. As a specific material, it most commonly refers to a type called polyethylene terephthalate (PET). Polyesters include naturally occurring chemicals, in plants and insects, as well as synthetics such as polybutyrate.

The term "acrylic" also known as Poly (methyl methacrylate) (PMMA), is a transparent thermoplastic often used in sheet form as a lightweight or shatter-resistant alternative to glass. The same material can be used as a casting resin or in inks and coatings, among many other uses. Acrylic sheet is easy to fabricate, bonds well with adhesives and solvents, and is easy to thermoform. It has superior weathering properties compared to many other transparent plastics.

A crosslinker, or a crosslinking agent, is a molecule which has at least two reactive ends to connect the polymer chains. The crosslinkers are usually reactive toward functional groups common on proteins such as carboxyls, amines, and sulfhydryls. Crosslinkers are generally selected based on their reactivity, length, and solubility. Crosslinkers can also be spontaneously reactive upon addition to a sample or be activated at a specific time, generally through photo-reactive groups.

Boiling is the rapid vaporization of a liquid, which occurs when a liquid is heated to its boiling point, the temperature at which the vapor pressure of the liquid is equal to the pressure exerted on the liquid by the surrounding atmosphere. At sea level the boiling point of water is 100° C. or 212° F. but at higher altitudes it drops to correspond with decreasing atmospheric pressures and at this stage water is called as boiling water.

The term "Adhesion" is the tendency of dissimilar particles or surfaces to cling to one another.

The term "Moist" is defined as a slightly or moderately wet condition.

The term "Warm" is something that is warm has some heat but not enough to be hot.

The term "Sterilization" refers to any process that removes, kills, or deactivates all forms of life (in particular referring to microorganisms such as fungi, bacteria, spores, unicellular eukaryotic organisms such as Plasmodium, etc.)

The term "Crystallinity" refers to the degree of structural order in a solid. In a crystal, the atoms or molecules are arranged in a regular, periodic manner. The degree of crystallinity has a big influence on hardness, density, transparency, and diffusion.

The term "Polypropylene", also known as polypropene, is a thermoplastic polymer used in a wide variety of applications. It is produced via chain-growth polymerization from the monomer propylene. Polypropylene belongs to the group of polyolefins and is partially crystalline and non-polar.

The term "Maleic anhydride" is an organic compound with the formula $C_2H_2(CO)_2O$. It is the acid anhydride of maleic acid. It is a colorless or white solid with an acrid odor. It is produced industrially on a large scale for applications in coatings and polymers.

The term "Polyolefin" is a type of polymer with the general formula $(CH_2CHR)_n$. They are derived from a handful of simple olefins (alkenes). Dominant in a commercial sense are polyethylene and polypropylene. More specialized polyolefins include polybutene, polyisobutylene and polymethyl pentene. The name polyolefin indicates the dominant olefin from which they are prepared, i.e., ethylene, propylene, butene, isobutene and 4-methyl-1-pentene.

The term "Maleic anhydride-grafted polypropylene (MAgPP)" is a compatibilizer which is very effective and commonly used for natural fiber and polymer matrix at the interface.

The term "Copolymer polypropylene" (COPP) is a specially modified highly transparent polypropylene random copolymer with medium melt flow, intended for injection molding and injection stretch blow molding. In addition to these properties, COPP is the best material for active hinges.

The properties of polypropylene depend on the molecular weight and molecular weight distribution, crystallinity, type and proportion of comonomer (if used) and the isotacticity.

In isotactic polypropylene, the methyl groups are oriented on one side of the carbon backbone. This arrangement creates a greater degree of crystallinity and results in a stiffer material that is more resistant to creep than both atactic polypropylene and polyethylene. Perfectly isotactic PP has a melting point of 171° C. (340° F.). Commercial isotactic PP has a melting point that ranges from 160 to 166° C. (320 to 331° F.), depending on atactic material and crystallinity.

Isotactic polypropylene can exist in various crystalline modifications which differ by the molecular arrangement of the polymer chains. The crystalline modifications are categorized into the α-, β- and γ-modification as well as mesomorphic (smectic) forms. The α-modification is predominant in iPP. Such crystals are built from lamellae in the form of folded chains. A characteristic anomaly is that the lamellae are arranged in the so-called "cross-hatched" structure. The melting point of α-crystalline regions is given as 185 to 220° C., the density as 0.936 to 0.946 g·cm-3. The β-modification is in comparison somewhat less ordered, as a result of which it forms faster and has a lower melting point of 170 to 200° C. The formation of the β-modification can be promoted by nucleating agents, suitable temperatures, and shear stress. The γ-modification is hardly formed under the conditions used in industry and is poorly understood. The mesomorphic modification, however, occurs often in industrial processing since the plastic is usually cooled quickly. The degree of order of the mesomorphic phase ranges between the crystalline and the amorphous phase, its density is with 0.916 g·cm-3 comparatively. The mesomorphic phase is considered as cause for the transparency in rapidly cooled films (due to low order and small crystallites).

The term "Polyurethane" (often abbreviated PUR and PU) is a polymer composed of organic units joined by carbamate (urethane) links. Polyurethane polymers are traditionally and most commonly formed by reacting a di- or triisocyanate with a polyol. Both the isocyanates and polyols used to make polyurethanes contain, on average, two or more functional groups per molecule.

The term "carbodiimide" (systematic IUPAC name: methanediimine) is a functional group with the formula RN=C=NR. They are exclusively synthetic.

The term "Melamine" is an organic compound with the formula $C_3H_6N_6$. This white solid is a trimer of cyanamide, with a 1,3,5-triazine skeleton.

The term "Aziridine" is an organic compound consisting of the three-membered heterocycle $(CH_2)_2NH$. It is a colorless, toxic, volatile liquid that is of significant practical interest.

The term "Waterborne ink" is also known as water-based ink. In an embodiment, waterborne ink contains 60% water or other solvents, 20% resin, 15% colorant and 5% additives. The main solvent is water, but there could also be other co-solvents present.

The term "UV borne inks" are types of inks dry by UV rays. UV inks are suitable for packaging decoration printing and shrink sleeve printing on multiple substrates including coated papers and films. Their immense advantage is fast curing and high level of adhesion.

The term "Solvent borne inks" include pigment and resin (binder), together constituting the solid component of the ink, diluted using a solvent.

This invention relates to a highly optically clear, composite film having a predominantly thermoplastic polypropylene base layer and an oriented primer layer of a polyester and acrylic blend composition. The base layer preferably relates to a thermoplastic biaxially oriented PP film label which is coated on one side. This film label includes print receptive layer, a core layer, and adhesive receptive layer. The print receptive layer includes components for an enhanced wettability for the coating adhesive and affinity to core layer PP having polar functional groups substituted on, grafted onto, or copolymerized into the polar polymer chain.

Base layer embodiments, i.e., with core layers predominantly of polyolefin, great preference is given to having an adhesive layer between the core layer and the barrier layer of a maleic anhydride-grafted polyolefin. A highly preferred adhesive layer composition for PP base layers is PP with grafted maleic anhydride. Another component is a COPP having surface energy increase and performance. The core layer comprised polypropylene. Preferably, the PP of the core layer is either isotactic or high crystalline PP. OPP film may cause the swelling and curling. Consequently, this behavior sometimes results in de-labeling. High crystalline PP can prevent or minimize curling issue. Adhesive receptive layer is suitable for a surface treatment such as flame and corona. This layer is preferably treated in a well-known manner to improve surface adhesion. Adhesive-receptive layer with specific surface properties that ensure a high level of adhesion for the hot melt adhesive and unique properties to prevent the label from curling. Highly functionalized surfaces to avoid tendency of layers of the reels to stick against themselves and facilitate the unwinding of the reel at high speed Composition of different layers of base layer is shown in Table 1.

TABLE 1

Composition of different layers of base layer

| | Weight % | | |
|---|---|---|---|
| Layer 1 | 2-4 | Printable/Coating Receptive Layer | MAH-g-PP, HOPP, COPP |
| Layer 2 | 96-92 | HOPP or HCPP | |
| Layer 3 | 2-4 | Adhesive receiving layer | HOPP, COPP |

The coating layer is preferably applied to the base layer from solution of acrylic and or polyurethane and is cross-linked using a crosslinking agent, such as but not limited to carbodiimide, melamine, aziridine etc. The primer coated base layer composite can be printed on using various techniques such as ink jet printing using various ink types such as, but not limited to water-borne, UV and solvent-borne inks. The polyurethane and acrylic based materials in the primer, especially in combination with a crosslinker, provides the acrylic-coated polypropylene base film with notably improved adhesion between the polypropylene and acrylic/polyurethane layers under moist, warm, boiling and sterilization conditions.

This invention is deemed suitable for implementation by two basic types of process methods, namely, "off-line" and "inline" methods. The procedures for film stretching and applying the printable layer coating solution distinguish these methods as will be explained. In polymer morphology orientation can involve alignment of the structural elements of the polymer, for example, polymer chains, segments of chains and crystallites. Orientation can cause anisotropic physical properties in a polymer product. For a polymer film, orientation can be induced by stretching the film. In this disclosure, the terms "orientation", "orienting", "oriented", and the like are used occasionally, whether or not accompanied by alignment of polymeric structural elements, and are meant to be interchangeable with corresponding terms, "stretch", "stretching", "stretched" and etc. In most high volume, polymeric film production, the film is formed continuously by extrusion and elongation in which the direction of material flow is commonly known as the "machine direction", Typically, the first technical direction is the machine direction, and the second technical direction is the cross-machine or "transverse direction" (i.e., in the plane of the film at 90 degree to the machine direction).

In an embodiment, film may be unoriented, uniaxially oriented or biaxially oriented. Uniaxially oriented means that the film is stretched only in a first technical direction.

Biaxial orientation occurs when a uniaxially oriented film is stretched in a second technical direction transverse to the first technical direction. Biaxial orientation can be achieved by stretching the film in both directions, either sequentially or simultaneously. For sequential biaxial orientation, first technical direction stretching is completed before stretching in the second technical direction. In simultaneous biaxial orientation, both first and second direction stretching occur at or near the same time.

In an "off-line" method the base layer film completely is formed, then wet barrier layer coating solution is applied to the completed base layer. When called for, optional skin and/or adhesive layers are added to the core layer to complete base layer formation in the first stage of the off-line method. In the off-line method the printable label coating solution can be applied to a uniaxially stretched base layer, but typically the base layer is biaxially stretched. Commonly, although not necessarily, the steps of base layer film forming, and barrier layer solution coating are performed discontinuously from each other. That is, the base layer film can be produced, stretched and held in storage for coating at a subsequent time and usually at a different location.

After production of the base layer, it is subjected to coating with the printable label liquid solution. Various solution coating methods well known in the art may be used. Representative examples include dip, spray, paint, doctor, gravure, and Mayer (sometimes referred to as "Meyer") rod type techniques. Preferably a Mayer rod coater with a No. 2 or No. 4 Mayer rod can be used. It is also sometimes helpful to ion discharge-treat the coating receiving side of the base layer prior to coating to improve adhesion of the barrier layer and/or to wet-out (i.e., uniformly spread) the coating liquid onto the base layer surface. Such discharge-treatment methods are well-known in the art as corona treatment, flame treatment, plasma treatment, atmospheric plasma treatment, or corona treatment in a controlled atmosphere.

After coating the base layer surface with the printable liquid coating solution, a solidified printable layer is formed heating the wet base layer. The heat both dries the printable coating layer by evaporating volatile liquid components and causes reactive components to crosslink the residual polymer of the liquid solution. Off-line coating separate from base layer film formation can be carried out in a continuous film coating operation.

In an embodiment, a more discontinuous off-line process is employed. After applying coating solution, volatile components are removed in a static oven at drying temperatures such that the coating is fully dried and crosslinked and the base layer experiences minimal thermal shrinkage. Care is recommended because the static film can be overheated in the oven such that damage to the composite film can occur, such as undesirable deformation of wrinkling, shrinkage or the like. To avoid such results, drying temperature in the static oven of the off-line method should be kept relatively low. For example, temperatures as low as about 75-80° C. might be suitable for drying. A potential problem of drying at too low a temperature is that the heat energy transmitted to the film is not sufficient to fully activate the cross linking to form strong bonds to the film substrate. Thus, to make a composite printable label film with effective bonding by the off-line method, attention must be given to balancing temperature and residence time conditions in the static oven.

The "inline coating" production method is a preferred embodiment of the invention. Basically, in this process, the base layer is formed, coated with a liquid coating solution, and heated to dry and crosslink the PUR (polyurethane) and/or acrylic in a unified and continuous process. According to other preferred embodiments, additional steps can be included, for example the base layer can be uniaxially stretched before coating with liquid solution. Also, the printable coating layer can be dried, crosslinked and stretched at the same time or in rapid succession after coating. Still further, the composite printable label film can be heat-treated to anneal the film after the printable coating layer is formed.

A major advantage of the inline method is that time and temperature of heat exposure during solution drying can be controlled very well. This permits higher temperatures to be used for appropriately short times. Consequently, the printable label layer solution can be dried with effectively complete crosslinking of the PUR and/or acrylic with reduced risk of damaging the film. Also, in the inline process, drying and crosslinking can be accomplished at or very near the same time as stretching the base layer in at least one direction. It has been found that such contemporaneous drying, crosslinking and stretching can significantly further improve the performance of the film when subjected to extreme conditions such as: such as high temperature sterilization/boiling.

Thus a particularly preferred embodiment of inline process includes the continuous, sequential steps of (a) forming a polymer core layer, (b) optionally adding an adhesive layer and/or a skin layer to make the base layer (c) stretching the base layer, preferably uniaxially in the machine direction, (d) coating the base layer with liquid solution of printable label PUR and or acrylic and crosslinker, (e) heating the coated base layer effectively to dry and crosslink the printable label PUR and or acrylic to form a printable layer, (f) optionally stretching the composite printable label PUR and or acrylic film in the transverse direction during or immediately following the drying and crosslinking step, and (g) optionally heat treating to anneal the composite printable label film. When present as a component of the base layer, step (d) coating is applied to the surface of the adhesive layer.

In an embodiment, the inline method includes extruding a web of polymer from granulated solid form such as pellets in a melt processing apparatus. Continuously following extrusion, the web is stretched in the first technical direction, usually the machine direction. The solution coating apparatus is positioned directly after the base layer is formed and uniaxially stretched. Liquid coating solution is applied while the base layer moves continuously through the coating apparatus application station. The same solution coating technologies described above for off-line coating may be used for placing the wet coat of barrier layer solution on the polymer base layer. For the inline method, reverse gravure roll coating techniques are preferred.

In an embodiment, directly and continuously following liquid solution coating of the base layer, drying, crosslinking and preferably biaxial stretching steps are performed in rapid succession. In-line fabrication can use the same composite barrier film finishing methods as described for "off-line", but instead of using a static oven, the film is continuously fed through a tenter frame stretching oven. The tenter frame stretching oven has several heating zones so that different segments of the process can be at temperatures tailored to accomplish each unit function. For example, the wet coat volatiles can be substantially completely removed to form a dry unitary barrier layer adhered to the substrate surface in preheating and drying heat oven zones. Then temperature can be adjusted to a range adapted to activating crosslinking of the acrylic and to biaxial stretching of the composite label film. Preferably the coating layer is fully dried before crosslinking and biaxial stretching. In a nominal 1.5 m wide tenter frame stretching oven at film machine direction travel speed of about 80 ft/min. (24 m/min.), typical crosslinking and biaxial stretching zone temperatures of the inline method are in the range of 155-160° C. for polypropylene base layer film, and in the range of about 90-121° C. for polyethylene terephthalate base layer film. These operating temperatures are much higher than should be used in the off-line method. Higher temperature can be tolerated during inline processing because the flow of film is continuous through the heat zones and time and temperature exposure can be controlled to avoid damaging the film. In another embodiment, some or all of the liquid solvent removal occurs, and the label coating is crosslinked with a melamine and or carbodiimide crosslinking agent during oven heating while conducting transverse stretching. After transverse stretching, the film can be heat-set to minimize shrinkage.

In an embodiment, the crosslinked printable coating layer can be stretched to large transverse extensions while remaining intact and maintaining excellent adhesion properties over the full surface of the multilayer film. This performance is predominantly observed when the wet coating solution is applied to an already uniaxially stretched base layer, and the printable label coating layer is contemporaneously dried, crosslinked and biaxially stretched this occurs in the carbodiimide and or melamine crosslinked printable label polymer layer. The printable label coating layer has been found to successfully extend to about 3-4.5 times its original transverse dimension, (i.e., 3 times-4.5 times) which is a property suitable for lower extension substrate materials such as polyesters. It is also able to extend to as much as 10 times original transverse dimension (i.e., 8 times-10 times) that is useful for higher extension capable substrate materials such as polyolefins, especially polypropylene base layer films.

In an embodiment, the print receptive layer includes components for an enhanced wettability for the coating adhesive and affinity to core layer PP having polar functional groups substituted on, grafted onto, or copolymerized into the polar polymer chain. The components comprise Mitsui Chemicals' Admer® AT2816A (MAH-g-PP), which contains about 40 wt % of the skin formulation.

In an embodiment, adhesive receptive layer is composed of HOPP (Total Petrochemicals 3272) about 79 wt % and COPP (Total Petrochemicals 8473) about 21 wt %.

In an embodiment, print receptive layer comprises about 40 wt % Admer® AT2816A, about 40 wt % Total 3377HA (0.8 wt % ethylene content mini-random copolymer HOPP), about 20 wt % ExxonMobil Vistamaxx® 3588 ethylene-propylene copolymer. In further embodiment, adhesive receptive layer is composed of HOPP (Total 3272) about 79 wt % and COPP (Total 8473) about 21 wt %.

In an embodiment, COPP has PE about 4% wt under Isotactic PP domain and having surface tension increased by around 2 dyne level (corona treatment).

In an embodiment, the core layer comprised polypropylene. High crystalline PP (HCPP) of Total 3273 is about 94% isotactic index. Preferably, the PP of the core layer is either isotactic or high crystalline PP. OPP film may cause the swelling and curling.

In an embodiment, adhesive-receptive layer with specific surface properties that ensure a high level of adhesion for the hot melt adhesive and unique properties to prevent the label from curling. Ethylene content under COPP (Vistamaxx® 3588, 4 wt %) increases adhesion to adhesive.

In an embodiment, highly functionalized surfaces may be used to avoid tendency of layers of the reels to stick against themselves and facilitate the unwinding of the reel at high speed. Mainly HOPP on adhesive layer is a kind of highly functionalized surfaces which has better curling resistance than other Random COPP or terpolymers (e.g. ethylene-propylene-butene copolymers).

In an embodiment, the coating is applied to the print receptive layer as described as the maleic anhydride grafted polyolefin. The coating describes a print receptive layer.

In an embodiment, the polyurethane and acrylic based materials in the primer, especially in combination with a crosslinker, provides the acrylic coated polypropylene base film with notably improved adhesion between the polypropylene and acrylic/polyurethane layers under moist, warm, boiling and sterilization conditions. The moist, warm and sterilization conditions is evaluated by submersing the coated film into boiling water for thirty minutes. As shown in the table, delta haze values of less than 4, for the inline crosslinked samples. The desired property for these label films is to provide a consistent delta haze of less than 5. Even though the coating itself may not be removed, the discoloration caused by an increase in haze would be unacceptable as Illustrated in Example 1.

In an embodiment, Total 3272 is used for HOPP. Isotactic content of about 90%. The polymer has a MFR about 2 g/10 min at 230° C., a melting point of about 163° C., a crystallization temperature of about 115-125° C., a heat of fusion of about 90-110 J/g, a heat of crystallization of about 105-110 J/g, and a density of about 0.90-0.91 g/cm3.

In an embodiment, the main difference between inline and off-line is Admer® 2816A (MAH-g-PP) presence or not. MAH-g-PP is a key polymer to adhesion promoter for aqueous coating to polypropylene substrates in inline coating. Preferred print coating receiving layer skin can be ca. 1 um thickness each while core is 48 um. A second skin layer can be coextruded upon the side of the core layer opposite the print coating receiving layer, also of ca. 1 um thickness. Total is 50 um structure for the overall film.

Figure 2:
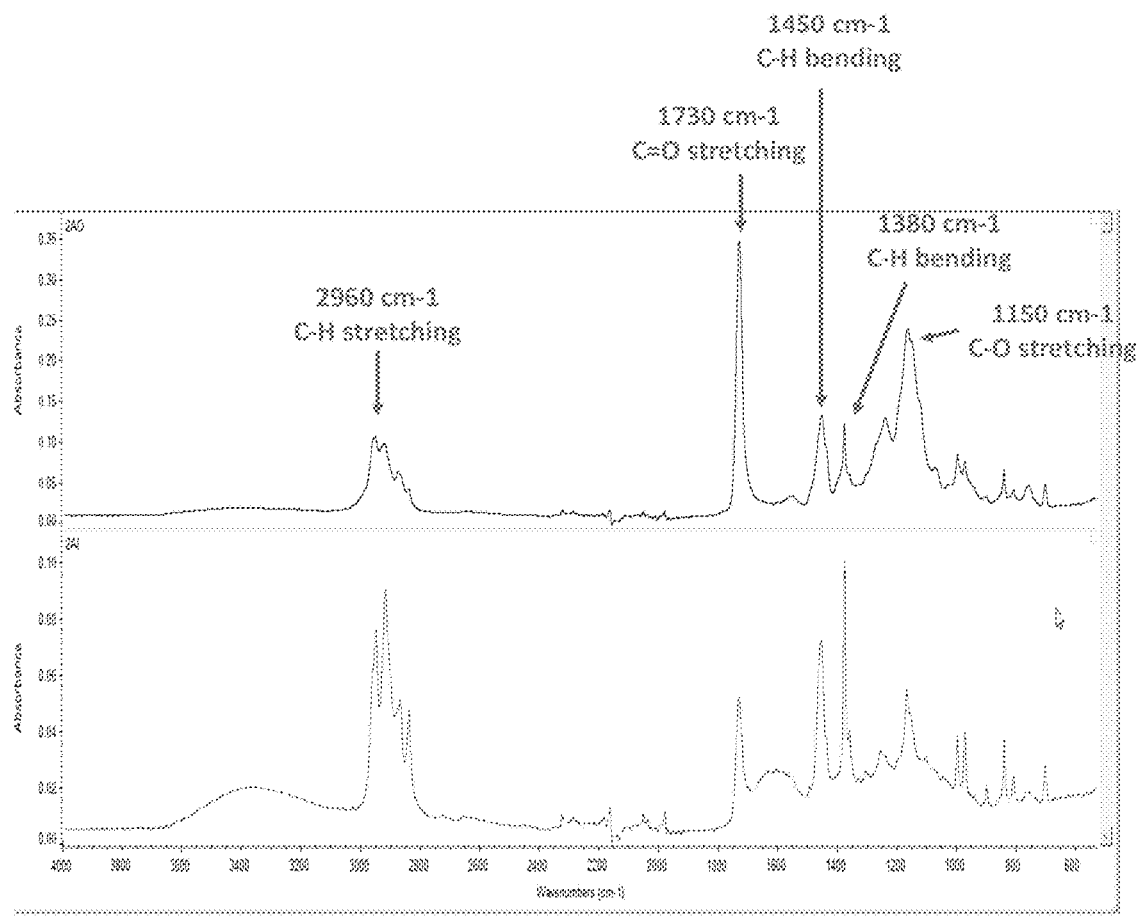
FIG. 2 shows FTIR spectra of Sample 1 (2AO=Sample 1 offline coated, 2A1=Sample 1 inline coated).
Figure 3:
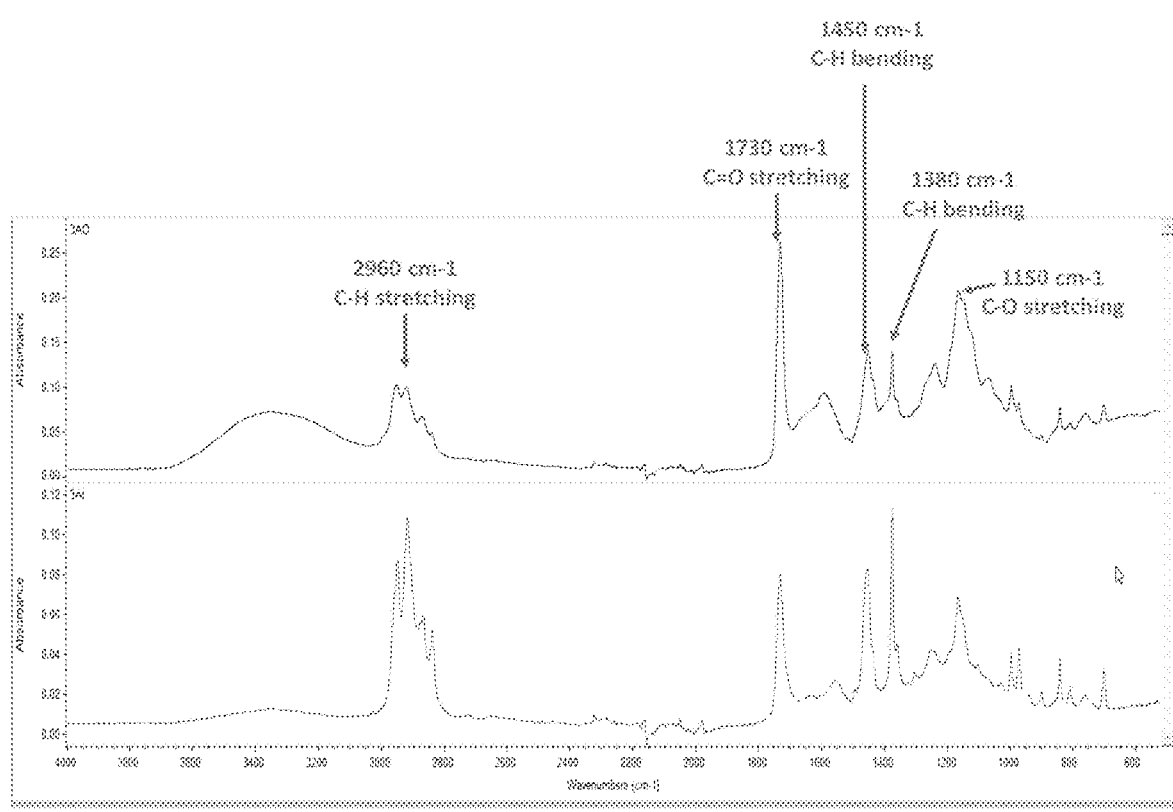
FIG. 3 shows FTIR spectra of Sample 2 (3AO=Sample 2 offline coated, 3A1=Sample 2 inline coated).

FIGS. 2 and 3 illustrates that the FTIR spectra indicate a difference in structure based on the process changes. The library spectra come up as an acrylic based coating, although some of the peaks also line up with polypropylene.

FIGS. 2 and 3 illustrates the FTIR spectrum for example 1 and 2 in offline and inline coating respectively. The peak around 2960 $cm^{-1}$ correspond to aliphatic CH stretching. The peaks near 1450 $cm^{-1}$ and 1380 $cm^{-1}$ are CH bending bands. Other peaks 1730 $cm^{-1}$ corresponds to the C=O of the acrylic ester group and peak at 1150 $cm^{-1}$ attributed CO stretching band.

The FTIR spectra indicate a difference in structure based on the process changes. In example 1 and 2 with inline coating, absorption band associated with CH stretching band (1380 $cm^{-1}$) has a higher intensity and absorbance than the absorption band associated with C—O stretching band (1150 $cm^{-1}$). Further, Absorption band associated with CH bending band (1450 $cm^{-1}$) has a greater intensity and absorbance than the absorption band associated with CO= stretching band (1730 $cm^{-1}$) and the absorption band of CH bending bend (1380 $cm^{-1}$) has a higher intensity and absorbance than the absorption band associated with CH bending band (1450 $cm^{-1}$). These said observation do not apply for example 1 and 2 with off-line coating.

This is invention will be better understood with reference to the following examples, which are intended to illustrate specific embodiments within the overall scope of the invention.

Test Methods

Haze measures the milkiness of the material (film or sheet). All plastics have some degree of light scattering (or transmission loss) which is usually measured by ASTM D1003. Hazemeters and spectrophotometers are used to measure the level of haze, light transmitting and light scattering properties of transparent materials.

There are several factors responsible for light scattering such as: impurities contained in the plastic material, surface roughness and internal optical irregularities caused by crystallization or material's level of crystallinity, other factors include in homogeneities (such as but not limited to density difference, fillers, pigments), and porosity, crystal size structure (Crosslinked) etc., mechanical and chemical degradation, and environmental factors such as weathering or surface abrasion.

Haze of the films was measured according to ASTM D1003 that determines the percent of transmitted light scattered at more than 2.5° from the incident light. A suitable instrument to measure haze is GARDNER HAZE-GUARD PLUS® #475. A haze change of 4 units or less was considered acceptable, and 3 units or less is preferred.

Topcoat Adhesion Test (Boil Test):

A 12.7 cm×25.4 cm sample of film coated with acrylic polymer as described is submerged in boiling water (100° C.) for 30 minutes. Thereafter, the surface of the film was visually inspected and rated according to the scale below.
- Rating 1 (Good): No discoloration, no coating transfer or delamination occurs
- Rating 2 (Acceptable): Discoloration occurs
- Rating 3 (Unacceptable): Discoloration and coating transfer or delamination occur.

Acrylic Material Adhesion Test (Tape Test):

A 12.7 cm×25.4 cm sample of film coated with coating solutions 1-4 is securely adhered with Scotch Brand 810 tape. Then, the tape is peeled off rapidly in the vertical and horizontal direction and observed for transfer of the coated layer and provided a rating of pass: no removal of coating or a fail: any removal of coating.

persion was a 20 wt % aqueous dispersion of synthetic amorphous silica particles (Nalco® 2329). The crosslinking agent was a 0.45 wt % aqueous dispersion of polycarbodiimide (Solucote® XL1, Covestro) and 1.39 wt % aqueous Melamine Formaldehyde (Cymel® 303LF, Allnex Corporation) as shown in Table 2

Example 2

The polyester dispersion was a 22.35 wt % solids polyester/acrylic blend, aqueous solution (1:1 Neocryl® A1127 and Neorez® A2092, Covestro). The silica particle dispersion was a 0.1 wt % aqueous dispersion of synthetic amorphous silica particles (Laponite SL 25, Byk-Chemie, Wessel, Germany). The crosslinking agent was a 2.4 wt % Melamine Formaldehyde (Cymel® 303LF, Allnex corporation) as shown in Table 2.

Example 3

The polyester dispersion was a 40 wt % solids acrylic, aqueous solution of Neocryl® BT67 (Covestro).

Example 4

The polyester dispersion was a 19.19 wt % solids acrylic, The silica particle dispersion was a 0.025 wt % aqueous dispersion of synthetic amorphous silica particles, Nalco® 2329 (Nalco Water) and a leveling solvent, Butyl Cellosolve (Dow Chemical). Formulation of a primer compositions for examples 1 and 4.

The liquid mixtures were formed by combining and blending to uniform composition 65 to 45 parts weight per hundred ("pph") of an acrylic and or a polyester dispersion, 0.3 to 0.025 pph of an aqueous silica particle dispersion, with 30-50 pph deionized water. and 1 to 3 pph of an aqueous crosslinking agent dispersion for Examples 1 & 2. Example 4 contains a leveling solvent at 2 pph.

TABLE 2

Compositions of Examples 1 thru 4

| Formulation Information | Example 1 | | Example 2 | | Example 3 | | Example4 | |
|---|---|---|---|---|---|---|---|---|
| | pph | solids fraction | pph | solids fraction | pph | solids fraction | pph | solids fraction |
| primer thickness | | .3 um | | .3 um | | .3 um | | .3 um |
| Acrylic/polyurethane dispersion | 61.89 | 20.42 | 48.59 | 22.35 | 20 | 7.8 | 39.19 | 15.28 |
| Water | 34.58 | 0.32 | 48.59 | 0 | 60 | 0 | 58.79 | 0 |
| Silica solution | 0.99 | 0.2 | 0.4 | 0.1 | 0 | 0 | 0.025 | 0.01 |
| Acid catalyst | 0.1 | 0.2 | 0 | 0 | 0 | 0 | 0 | 0 |
| Carbodiimide crosslinking agent | 1.04 | 0.45 | 0 | 0 | 0 | 0 | 0 | 0 |
| Melamine crosslinking Agent | 1.40 | 1.39 | 2.42 | 2.4 | 0 | 0 | 0 | 0 |
| leveling Solvent | 0 | 0 | 0 | 0 | 0 | 0 | 2 | 0 |

EXAMPLES

Example 1

The polyester dispersion was a 20.42 wt % solids polyester/acrylic blend, aqueous solution (Habbcure® 1477, Habbco Industries, Seekonk, MA). The silica particle dis- Each example was applied to the polypropylene film substrate by 1) off-line coating and 2) inline coating.

Each coated film sample was then exposed to a 30 minutes boil test to simulate the sterilization process. Each sample was then tested for haze and tape adhesion and data is given in Table 3.

TABLE 3

Comparison of properties of Example 1 thru 4 prepared by inline and offline method.

|  |  | Haze Value | | | 30 min boil test | 810 |
|---|---|---|---|---|---|---|
|  |  | initial haze | 30 min Boil | Delta Haze | evaluation rating | Tape Testing |
| Offline coated examples | Example 1 | 1.28 | 76.7 | 75.42 | 3 | Pass |
|  | Example 2 | 2.02 | 81.5 | 79.48 | 3 | Pass |
|  | Example 3 | 3.74 | 31.9 | 28.16 | 3 | Pass |
|  | Example 4 | 4.76 | 24.5 | 19.74 | 3 | Pass |
| Inline coated examples | Example 1 | 1.82 | 4.55 | 2.73 | 1 | Pass |
|  | Example 2 | 4.37 | 7.37 | 3.05 | 1 | Pass |
|  | Example 3 | 8.63 | 12.3 | 3.67 | 1 | Pass |
|  | Example 4 | 7.49 | 9.87 | 2.38 | 1 | Pass |

Table 3 demonstrates that the Haze value of examples 1 thru4 in the case of inline coating is lower as compared to offline coating, indicating that no milkiness appears after boiling in water for 30 minutes.

In an embodiment, the film could be used as a label for a can. A food can is often put under boiling water bath to make the canned food safer for eating purpose. On boiling, films presently produced by offline method becomes hazy and opaque. The present invention solves this problem as explained in Table 3.

What is claimed is:

1. A film comprising:
   a base layer comprising a biaxially oriented polypropylene (BOPP);
   a coating layer comprising a polyester, an acrylic, and a crosslinker; and
   a primer;
   wherein the film has a haze change, measured according to ASTM D1003, before exposure to boiling water for 30 minutes and after an exposure to boiling water for 30 minutes of 4 units or less;
   wherein according to FTIR the film has a first absorbance at a first wavelength of 1380 cm$^{-1}$ higher than a second absorbance at a second wavelength of 1150 cm$^{-1}$ and a third absorbance at a third wavelength of a 1450 cm$^{-1}$ wavelength; and
   wherein the third absorbance is higher than a fourth absorbance at a fourth wavelength of 1730 cm$^{-1}$.

2. The film of claim 1, wherein the primer is included in the coating layer.

3. The film of claim 1, wherein the primer produces a higher adhesion between the base layer and the coating layer under moist, warm and sterilization conditions as compared to a comparable film having a composition as that of the film but not containing the primer.

4. The film of claim 1, wherein the film has a high crystallinity in a range of about 90-99% isotactic index.

5. The film of claim 1, wherein the base layer comprises a print receptive layer, a core layer, and an adhesive receptive layer.

6. The film of claim 5, wherein the core layer comprises polypropylene.

7. The film of claim 5, wherein the print receptive layer comprises a first component for wettability of a coating adhesive and a second component to form an affinity with the BOPP of the core layer.

8. The film of claim 7, wherein the first component comprises maleic anhydride grafted polypropylene (MAH-g-PP).

9. The film of claim 5, wherein the print receptive layer comprises maleic anhydride grafted polypropylene (MAH-g-PP), homopolymer polypropylene (HOPP), or a copolymer polypropylene (COPP).

10. The film of claim 5, wherein the adhesive receptive layer comprises a copolymer polypropylene (COPP) and HOPP.

11. The film of claim 5, wherein the base layer comprises about 2% to about 4% by weight of the print receptive layer, about 92% to about 96% by weight of the core layer, and about 2% to about 4% by weight of the adhesive receptive layer, wherein all weights are based on a total weight of the base layer.

12. The film of claim 1, wherein the film further comprises a barrier layer comprising maleic anhydride and a polyolefin.

13. The film of claim 12, wherein an adhesive layer is between the barrier layer and a core layer.

14. The film of claim 13, wherein the adhesive layer comprises maleic anhydride and a polyolefin.

15. The film of claim 1, wherein the coating layer comprises polyurethane.

16. The film of claim 1, wherein the primer comprises polyurethane.

17. The film of claim 1, wherein the crosslinker comprises carbodiimide, melamine or aziridine.

18. The film of claim 1, wherein the film further comprises silica particles.

19. The film of claim 1, wherein the film is configured to be printable using an ink.

20. The film of claim 19, wherein the ink is selected from a waterborne ink, a UV borne ink, or a solvent borne ink.

* * * * *